United States Patent
Yang et al.

(10) Patent No.: US 11,803,959 B2
(45) Date of Patent: Oct. 31, 2023

(54) INDIVIDUAL PLANT RECOGNITION AND LOCALIZATION

(71) Applicant: Mineral Earth Sciences LLC, Mountain View, CA (US)

(72) Inventors: Jie Yang, Sunnyvale, CA (US); Zhiqiang Yuan, San Jose, CA (US); Hongxu Ma, Mountain View, CA (US); Cheng-En Guo, Santa Clara, CA (US); Elliott Grant, Woodside, CA (US); Yueqi Li, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 990 days.

(21) Appl. No.: 16/450,238

(22) Filed: Jun. 24, 2019

(65) Prior Publication Data
US 2020/0401883 A1  Dec. 24, 2020

(51) Int. Cl.
*G06V 10/74* (2022.01)
*G06T 7/00* (2017.01)
(Continued)

(52) U.S. Cl.
CPC .......... *G06T 7/001* (2013.01); *G05D 1/0033* (2013.01); *G06F 18/214* (2023.01);
(Continued)

(58) Field of Classification Search
CPC ........ G06N 3/08; G06N 20/00; G06N 3/0481; G06V 10/82; G06V 10/74; G06V 20/188;
(Continued)

(56) References Cited

U.S. PATENT DOCUMENTS 11,017,203 B1 * 5/2021 Aggarwal .......... G06V 40/1365
11,436,553 B2 * 9/2022 Kirmani ............... G01G 19/005
(Continued)

FOREIGN PATENT DOCUMENTS

WO    WO-2017071928 A1 * 5/2017 ......... G06K 9/00664

OTHER PUBLICATIONS

Ingensand, Hilmar et al. "1st International Conference on Machine Control & Guidance: Proceedings." 1st International Conference on Machine Control & Guidance. EIH, 2008; 334 pages.
(Continued)

*Primary Examiner* — Shaghayegh Azima
(74) *Attorney, Agent, or Firm* — Gray Ice Higdon

(57) ABSTRACT

Implementations are described herein for training and applying machine learning models to digital images capturing plants, and to other data indicative of attributes of individual plants captured in the digital images, to recognize individual plants in distinction from other individual plants. In various implementations, a digital image that captures a first plant of a plurality of plants may be applied, along with additional data indicative of an additional attribute of the first plant observed when the digital image was taken, as input across a machine learning model to generate output. Based on the output, an association may be stored in memory, e.g., of a database, between the digital image that captures the first plant and one or more previously-captured digital images of the first plant.

18 Claims, 7 Drawing Sheets

(51) Int. Cl.
*G05D 1/00* (2006.01)
*G06N 3/04* (2023.01)
*G06N 3/08* (2023.01)
*G06V 20/10* (2022.01)
*G06F 18/214* (2023.01)
*G06F 18/20* (2023.01)
*G06V 10/764* (2022.01)
*G06V 10/776* (2022.01)
*G06V 10/82* (2022.01)
*G06V 10/20* (2022.01)
*G06V 20/20* (2022.01)

(52) U.S. Cl.
CPC ......... *G06F 18/285* (2023.01); *G06N 3/0418* (2013.01); *G06N 3/08* (2013.01); *G06V 10/255* (2022.01); *G06V 10/74* (2022.01); *G06V 10/764* (2022.01); *G06V 10/776* (2022.01); *G06V 10/82* (2022.01); *G06V 20/188* (2022.01); *G06V 20/20* (2022.01)

(58) Field of Classification Search
CPC ... G06K 9/6256; G06K 9/6267; G06K 9/6227
See application file for complete search history.

(56) References Cited

U.S. PATENT DOCUMENTS

| | | | | |
|---|---|---|---|---|
| 2016/0148104 A1* | 5/2016 | Itzhaky | ................... | G06N 3/08 706/12 |
| 2017/0206415 A1* | 7/2017 | Redden | ................ | G06V 20/188 |
| 2018/0330166 A1* | 11/2018 | Redden | ................ | G06V 20/188 |
| 2018/0373937 A1* | 12/2018 | Shulman | .................. | H04N 7/18 |
| 2019/0180151 A1* | 6/2019 | Fryshman | ................ | A01M 5/02 |
| 2020/0090368 A1* | 3/2020 | Szeto | ................. | G02B 27/0172 |
| 2020/0234088 A1* | 7/2020 | Taha | .................... | G06V 10/764 |
| 2020/0380403 A1* | 12/2020 | Aggarwal | .............. | G06F 18/21 |
| 2022/0117218 A1* | 4/2022 | Sibley | ................. | A01M 7/0042 |
| 2022/0132829 A1* | 5/2022 | Kwak | .................. | B05B 12/122 239/11 |
| 2022/0330468 A1* | 10/2022 | Underwood | ......... | G06V 20/188 |

OTHER PUBLICATIONS

Nagano, Shogo et al. "Leaf-Movement-Based Growth Prediction Model Using Optical Flow Analysis and Machine Learning in Plant Factory." Frontiers in Plant Science, Mar. 2019, vol. 10; Article 227 (2019); 10 pages.

Šulc, Milan et al. "Fine-Grained Recognition of Plants From Images." Plant Methods 13:115 (2017); 14 pages.

Sun, Yu et al. "Deep Learning for Plant Identification in Natural Environment." Computational Intelligence and Neuroscience, vol. 2017, Article ID 7361042 (2017); 7 pages.

European Patent Office; International Search Report and Written Opinion of PCT Ser. No. PCT/US2020/039358; 12 pages; dated Oct. 9, 2020.

\* cited by examiner

2019 HYPOTHETICAL FARMS NW FIELD     550

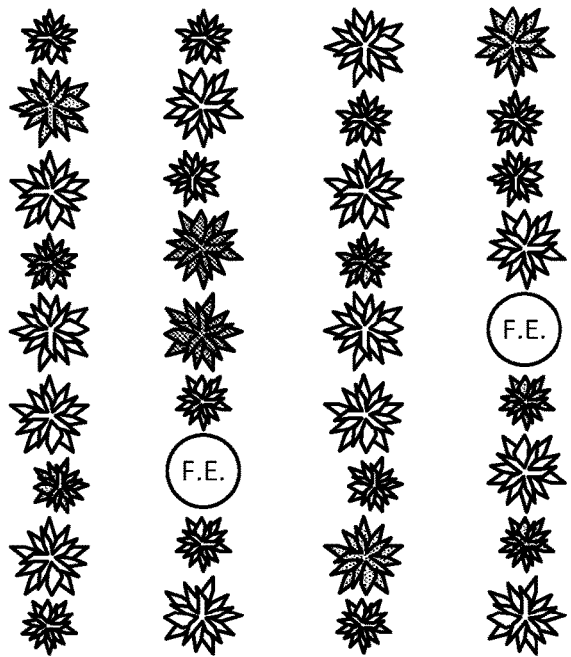

552

STATISTICS ABOUT SELECTED PLANT(S):
(* IF MULTIPLE PLANTS SELECTED, VALUE IS AN AVERAGE)

HEALTH (DISEASED, MALNOURISHED, HEALTHY):   HEALTHY
ESTIMATED FRUIT VOLUME:                     0.7 KG
AVG FRUIT VOLUME:                           150G
PROJECTED YIELD IN KG:                      11
AVG LEAF SIZE:                              68CM$^2$
AVG LEAF ORIENTATION:                       X DEGREES
FRUIT GENOTYPE:                             Ff
NUMBER BRANCHES:                            12

<u>CLICK HERE</u> TO VIEW TIME LAPSE SEQUENCE OF IMAGES OF SELECTED PLANT(S)

Fig. 5

INDIVIDUAL PLANT RECOGNITION AND LOCALIZATION

BACKGROUND

It is becoming increasingly practical to obtain a multitude of digital images capturing plants in an environment such as a field of a farm. Autonomous or semiautonomous vehicles such as mobile robots or aerial vehicles (e.g., drones) may be equipped with one or more vision sensors that are operable to acquire digital images of plants from various spatial and/or temporal perspectives. For example, a wheeled robot equipped with camera(s) on its underbelly may be navigated along a row of crops so that its camera(s) can be operated to capture digital images of the crops, e.g., at a particular frequency or sample rate, on demand, etc.

Numerous different technologies exist for identifying a type of a plant (i.e., classify the plant) based on image data, but these technologies are not concerned with recognizing individual plants as distinct from other individual plants. However, the ability to recognize and distinguish between individual plants may be useful for a variety of purposes. For example, if individual plants can be identified and/or distinguished from each other over time, it may be possible to track individual plants' growth (or lack thereof), disease progression, fruit development (or lack thereof), and so forth. Tracking these metrics enables other applications, such as distinguishing portions of crop fields that are not meeting growth expectations (e.g., due to disease, insufficient or too much irrigation, insufficient or too much fertilizer, etc.) from other portions that are meeting growth expectations.

Many of the camera-equipped vehicles may be equipped with position coordinate sensors such as Global Positioning System ("GPS") sensors, inertial movement unit ("IMU") sensors, triangulation-based position coordinate sensors (e.g., using wireless communication signals), and so forth. However, the position coordinates obtained by these sensors and assigned to capture digital images may not be sufficiently accurate to distinguish between different plants, especially if the plants are in close proximity with each other, as would often be the case on a farm.

SUMMARY

Techniques are described herein for training and applying machine learning models to digital images capturing plants, and to other data indicative of attributes of individual plants captured in the digital images, to recognize individual plants in distinction from other individual plants. In various implementations, the individual plants' unique identities may be used for various purposes, such as tracking growth and/or disease progression of individual plants over time. Being able to recognize individual plants, as opposed to only classifying each plant as a particular type of plant, may enable more fine-tuned agricultural management.

In some implementations, a unique identifier may be generated for each unique plant. A plurality of plants, e.g., of a field or farm, may be indexed in a database using their respective unique identifiers. As used herein, a "unique identifier" is not limited to an identifier that is unique across all domains. Rather, a "unique identifier" refers to an identifier that is unique in a particular domain, i.e. "unique enough" for purposes of the entity using it. For example, a particular entity may only need to distinguish between individual plants on one or more farms they are analyzing. In such a situation the unique identifier assigned to each individual plant need only be unique enough to distinguish from other plants of the farm(s) under consideration.

However, unique identifiers are not necessarily required for plant recognition. In some implementations, it may be sufficient to determine and store an association between multiple digital images that depict a particular plant. These multiple digital images may be captured over time and/or from multiple vantage points relative to the plant.

Various types of machine learning models may be trained and utilized to recognize individual plants using image data. In some implementations, a convolutional neural network ("CNN") may trained using techniques such as triplet loss to recognize individual plants. In other implementations, a sequence-to-sequence model such as an encoder-decoder may be trained to recognize individual plants, e.g., by using a sequence of images known to depict a particular plant to predict the plant's appearance in a next image and matching that predicted appearance to a ground truth image obtained in the field.

In many implementations, additional data beyond digital images capturing the plants under consideration may be used to recognize individual plants as distinct from other plants (including other plants of the same type). This additional data may include, for example, data indicative of additional attributes of the plants. Attributes of individual plants may include, for instance, a position coordinate assigned to a digital image capturing the individual plant, one or more spatial dimensions of a bounding shape enclosing the individual plant, temporal data associated with the digital image (which may provide a time interval since some milestone, such as planting, last photograph, etc.), surrounding environmental context of the individual plant, other sensor readings (e.g., soil moisture, temperature, etc.), and so forth.

In some implementations, data indicative of the additional attribute of the plant may be used to train the machine learning model. In some such implementations, the data indicative of the additional attribute of the plant may be applied as additional input to the machine learning model, along with one or more digital images. For example, the machine learning model may be training using a plurality of training instances. Each training instance may include one or more training digital images of a particular plant and additional data indicative of an additional attribute of the particular plant at the time the one or more training digital images were taken.

In implementations in which the additional attribute used is a position coordinate (or more generally, an observed location), so long as the individual plants have not been moved since the machine learning model was trained, the position coordinates may aid the model in distinguishing one plant from another. For example, associations between position coordinates of individual plants and those plants' physical appearances may be "baked" into embeddings generated using the machine learning model. More generally, the position coordinate associated with a digital image capturing an individual plant may, e.g., when applied as additional input to the model, effectively reduce the search space of candidate plants that may potentially match the individual plant. Intuitively, one plant that is spatially far away from a location at which a given digital image was captured is not likely to match another plant depicted in the given digital image.

Various aspects of bounding shapes that enclose individual plants may also be used, in addition to or instead of other plant attributes described herein, as additional attributes of those plants. For example, an image of a plant may be processed to determine a minimum bounding shape (e.g., square, rectangle, circle, polygon, etc.) that encloses at least a portion of the plant (e.g., stems and fruit), if not the entire plant. Various aspects of that bounding shape, such as a diameter, radius, width, height, number of edges used (in the case of polygon bounding shapes), may be used as additional attributes of the individual plant. These spatial attributes may effectively be used as proxies for spatial dimensions of the plant itself (which may be more difficult to quantify given the complex shape/appearance of most plants). In some implementations, these spatial dimension(s) of the bounding shapes may be used as additional inputs for the machine learning model, in addition to the digital image itself, to recognize a plant in distinction from other plants.

Temporal data associated with a digital image of a plant may also be used, in addition to or instead of other attributes of the plant and the digital image, to recognize the plant in the digital image. For example, a timestamp associated with a particular digital image may be used to calculate a time interval since some reference milestone in the plants' life, such as planting, being transferred to a new location, most recent photograph, etc. In some implementations, milestones of multiple plants, e.g., crops in a field, may be aligned, e.g., because all the plants were planted or last photographed at or around the same time. Thus, a time interval since such a milestone may be useful for distinguishing one individual plant from another. For example, suppose a machine learning model is trained on training instances captured across a time interval, and those temporal differences are captured in the model during training by being included as inputs in the training data. That machine learning model may effectively be able to "predict" future states of individual plants, such that those individual plants are recognizable in subsequent images.

These time intervals may be particularly useful in combination with other plant attributes. As a non-limiting example, suppose a particular plant has a bounding shape of a particular width five weeks after being planted. Suppose the same plant is photographed two weeks later. A new bounding shape determined for the new digital image will likely be larger than the previous bounding shape, unless the plant is diseased or malnourished. An association between the time interval since the last photograph (two weeks) and an expected growth rate of the plant (individual or as part of a population) may have been effectively baked into the machine learning model during training. Consequently, the larger bounding shape, and in some implementations, a delta between the smaller and larger bounding shapes, may be used in conjunction with the new digital image to identify the plant in distinction from other plants.

In addition to or instead of minimum bounding shapes that enclose all or part of a plant, in some implementations, bounding shapes may be expanded intentionally, e.g., some predetermined dimension beyond the minimum bounding shape, in order to capture individual plants' environmental contexts. Thus, in addition to the plant itself, its neighbors and/or other visual artifacts proximate the plant may be leveraged to recognize the plant. Intuitively, if a particular plant was observed near a sprinkler head during training, then a subsequent digital image depicting a plant having the same spatial relationship with a sprinkler head may, when applied across the machine learning model, generate output that indicates the subsequent digital image depicts the same plant.

In some implementations, a method implemented using one or more processors may include: obtaining a digital image that captures at least a first plant of a plurality of plants; determining, based on a sensor signal generated by a sensor, additional data indicative of an additional attribute of the first plant; applying the digital image and the additional data as input across a machine learning model to generate output, wherein the machine learning model is trained using a plurality of training instances, and wherein each training instance includes one or more training digital images of a particular plant and additional data indicative of an additional attribute of the particular plant when the one or more training digital images were taken; based on the output, storing in memory an association between the digital image that captures the first plant and one or more previously-captured digital images of the first plant.

In various implementations, the obtaining includes: operating an autonomous or semiautonomous vehicle equipped with a vision sensor to traverse along a path that is proximate to at least a subset of the plurality of plants; an operating the vision sensor to acquire the digital image that captures the first plant.

In various implementations, the machine learning model comprises a convolutional neural network. In various implementations, the convolutional neural network is trained on the plurality of training instances using triplet loss.

In various implementations, the sensor comprises a position coordinate sensor, and the additional attribute of the first plant comprises a position coordinate indicative of a location of the first plant. In various implementations, the sensor comprises a vision sensor. In various implementations, the additional attribute of the first plant comprises a spatial dimension of a bounding shape, determined from one or more digital images generated by the vision sensor, which encloses at least a portion of the first plant. In various implementations, the bounding shape comprises a minimum bounding shape that encloses an entirety of the first plant.

In various implementations, the additional attribute of the first plant comprises an environmental context of the first plant captured in one or more digital images generated by the vision sensor. In various implementations, the additional attribute of the first plant comprises a time interval since a milestone in a life of the first plant.

In various implementations, the method may further include: receiving, from a graphical user interface rendered on a computing device, user selection of a user interface element that corresponds to the first plant; and based on the receiving, causing the computing device to output first plant information based on the digital image that captures the first plant and one or more of the previously-captured digital images of the first plant. In various implementations, the first plant information includes a time-based sequence of digital images that includes the digital image that captures the first plant and one or more of the previously-captured digital images of the first plant. In various implementations, the first plant information includes first plant growth or health statistics generated based on the digital image that captures the first plant and one or more of the previously-captured digital images of the first plant.

In various implementations, the method may further include: analyzing the digital image that captures the first plant and one or more of the previously-captured digital images of the first plant; and based on the analyzing, predicting a growth rate or yield of the first plant.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 depicts an example graphical user interface according to implementations disclosed herein.

DETAILED DESCRIPTION

Figure 1:
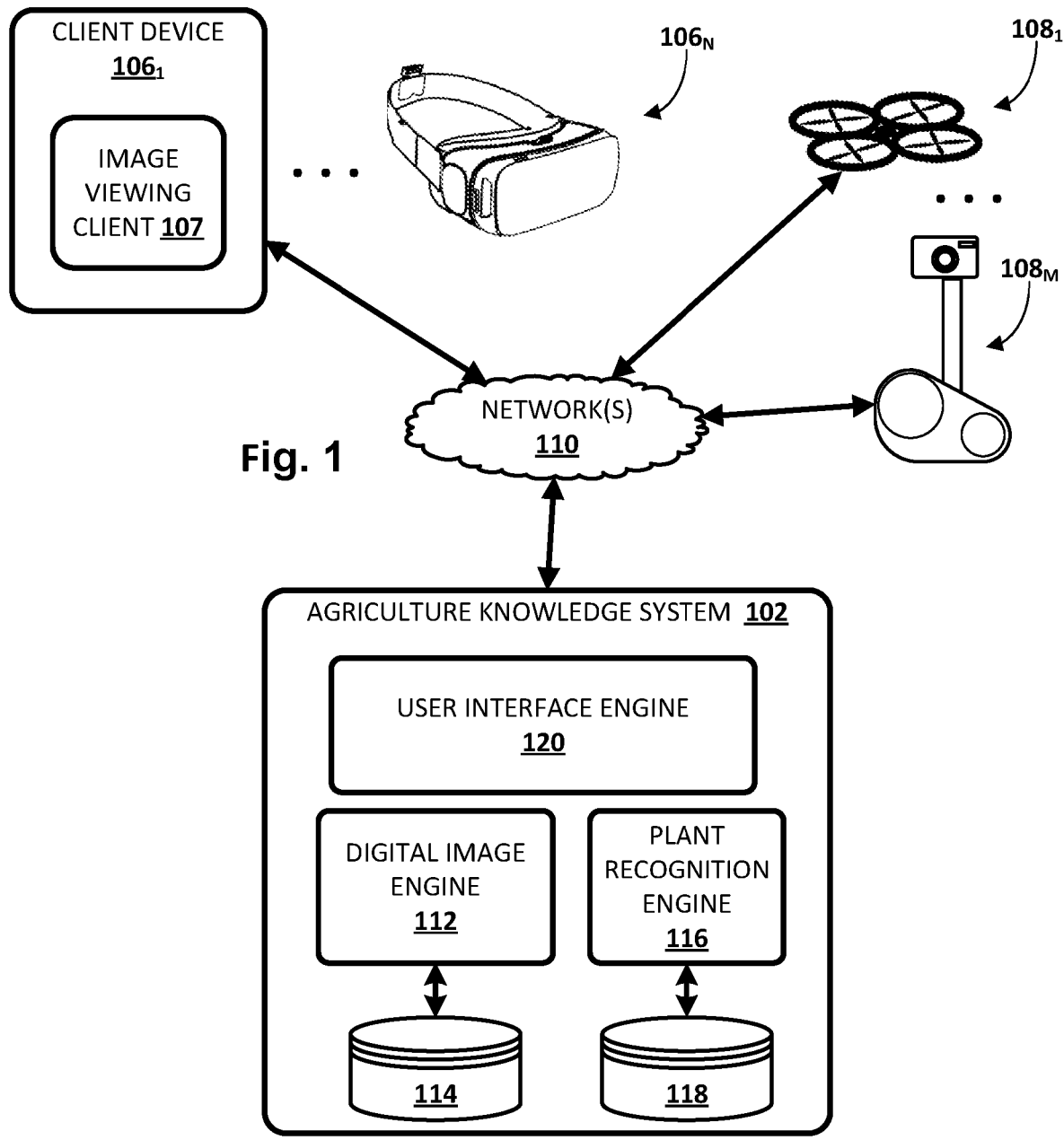
FIG. 1 schematically depicts an example environment in which selected aspects of the present disclosure may be implemented, in accordance with various implementations.

FIG. 1 illustrates an environment in which one or more selected aspects of the present disclosure may be implemented, in accordance with various implementations. The example environment includes a plurality of client devices $106_{1-N}$, an agriculture knowledge system 102, and one or more sources of vision data $108_{1-N}$. Each of components $106_{1-N}$, 102, and 108 may communicate, for example, through a network 110. Agriculture knowledge system 102 is an example of an information retrieval system in which the systems, components, and techniques described herein may be implemented and/or with which systems, components, and techniques described herein may interface.

An individual (which in the current context may also be referred to as a "user") may operate a client device 106 to interact with other components depicted in FIG. 1. Each component depicted in FIG. 1 may be coupled with other components through one or more networks 110, such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an augmented reality ("AR") or virtual reality ("VR") immersive computing experience, a "smart" watch, and so forth. Additional and/or alternative client devices may be provided.

Each of client devices 106 and agriculture knowledge system 102 may include one or more memories for storage of data and software applications, one or more processors for accessing data and executing applications, and other components that facilitate communication over a network. The operations performed by client device 106 and/or agriculture knowledge system 102 may be distributed across multiple computer systems. For example, agriculture knowledge system 102 may be implemented as, for example, computer programs running on one or more computers in one or more locations that are coupled to each other through a network.

Each client device 106 may operate a variety of different applications that may be used, for instance, to view information about individual plants and/or groups of plants that is generated using techniques described herein. For example, a first client device $106_1$ operates an image viewing client 107 (e.g., which may be standalone or part of another application, such as part of a web browser). Another client device $106_N$ may take the form of a HMD that is configured to render two-dimensional ("2D") and/or three-dimensional ("3D") data to a wearer as part of a VR immersive computing experience. For example, the wearer of client device $106_N$ may be presented with 3D point clouds representing various aspects of objects of interests, such as fruits of crops.

In various implementations, agriculture knowledge system 102 may include a digital image engine 112, a plant recognition engine 116, and/or a user interface engine 120. In some implementations one or more of engines 112, 116, and/or 120 may be omitted. In some implementations all or aspects of one or more of engines 112, 116, and/or 120 may be combined. In some implementations, one or more of engines 112, 116, and/or 120 may be implemented in a component that is separate from agriculture knowledge system 102. In some implementations, one or more of engines 112, 116, and/or 120, or any operative portion thereof, may be implemented in a component that is executed by client device 106.

Digital image engine 112 may be configured to receive, directly or indirectly from data sources $108_{1-M}$, a plurality of two-dimensional 2D images captured by one or more 2D vision sensors. In various implementations, the 2D images each may capture an individual plant among a populations of plants (e.g., fields of plants). In some implementations, each digital image may capture an individual plant surrounded by some environmental context, e.g., that includes other visual features such as sprinkler heads, rocks, or other artificial or natural features that can be used as visual landmarks. In other implementations, the vision data received from robots $108_{1-N}$ may include 3D data generated using 3D vision sensors such as light detection and ranging ("LIDAR") sensors, stereographic cameras, etc.

2D/3D vision data may be obtained from various sources. In the agricultural context these data may be obtained manually by individuals equipped with cameras, or automatically using one or more robots $108_{1-M}$ equipped with 2D/3D vision sensors (M is a positive integer). Robots 108 may take various forms, such as an unmanned aerial vehicles $108_1$, a wheeled robot $108_M$, a robot (not depicted) that is propelled along a wire, track, rail or other similar component that passes over and/or between crops, or any other form of robot capable of being propelled or propelling itself past crops of interest. In some implementations, robots $108_{1-M}$ may travel along lines of crops taking pictures at some selected frequency (e.g., every second or two, every couple of feet, etc.), or whenever a whole plant is detected within a field-of-view of the vision sensor.

Robots $108_{1-M}$ may provide the vision data they capture to agriculture knowledge system 102 over network(s) 110. Digital image engine 112 may be operably coupled with a database 114 that it uses to store vision data (e.g., digital images) captured by any number of sources (e.g., robots 108). In some implementations, a user may interact operate a client device 106 to interact with user interface engine 120. During this interaction the user may request that particular sets of vision data be processed by agriculture knowledge system 102 using techniques described herein to allow the user to view information about individually-recognized plants.

Plant recognition engine 116 may be configured to perform various aspects of the present disclosure on vision data captured from various sources, such as people, robots 108, etc., to be able to recognize, in vision data such as 2D digital images, individual plants in distinction from other individual plants (including other individual plants of the same genus or species). For example, in some implementations, plant recognition engine 116 may be configured to obtain a digital image that captures at least a first plant of a plurality of plants. This digital image may have been previously captured and provided to digital image engine 112, or plant recognition engine 116 may obtain the digital image directly from the source, such as one of robots $108_{1-M}$.

Plant recognition engine 116 may also determine additional data indicative of an additional attribute of the first plant. As noted above, this additional data may take various forms. In some implementations, the additional data may be determined from a sensor signal generated by a sensor of a device used to capture the digital image. For example, many robots 108 are equipped with position coordinate sensors, such as inertial measurement units ("IMU") sensors, global positioning system ("GPS") sensors, sensors that obtain position from triangulation of wireless signals, etc. Position coordinates may be generated using sensors such as these while a vision sensor captures a digital image of a plant. The position coordinate may then be associated with the digital image of the plant, e.g., as metadata.

This additional data may take other forms in addition to or instead of position coordinates. For example, in various implementations, a bounding shape may be calculated for the first plaint. Various techniques such as edge detection, machine learning (e.g., a convolutional neural network, or "CNN"), segmentation, etc., may be employed to detect a bounding shape that encloses at least a portion of the first plant, e.g., a minimum bounding shape that encloses an entirety of the first plant. In some such implementations, various aspects of such a bounding shape, such as its height, width, diameter, shape, etc., may be used as an additional attribute of the first plant.

Additionally or alternatively, in some implementations, plant recognition engine 116 may calculate a bounding shape that captures not only the plant, but some portion of an environment or area that surrounds the first plant. In this way plant recognition engine 116 is able to determine an environmental context of the first plant. For example, the first plant's spatial relationship to one or more neighboring plants may be useful in recognizing first plant in distinction from other individual plants. As another example, artificial or natural landmarks near the first plant, such as rocks, weeds, flowers, moss, sprinkler heads, other irrigation equipment such as hoses/pipes or valves, indicia or fiducial markers placed near the first plant (e.g., as a standalone sign, a tag on the plant, or on irrigation equipment), natural formations, etc., may for part of the first plant's environmental context, and may also be used to recognize the first plant in distinction from other individual plants.

In some implementations, temporal data associated with a digital image of the first plant may also be used, e.g., by plant recognition engine 116, in addition to or instead of other attributes of the first plant and the digital image, to recognize the first plant in the digital image. For example, a timestamp associated with the digital image may be used to calculate a time interval since some reference milestone in the first plants' life, such as its planting, its being transferred to a new location, its most recent digital image, etc. In some implementations, milestones of multiple plants, e.g., crops in a field, may be aligned, e.g., because all the plants were planted or last photographed at or around the same time. Thus, a time interval since such a milestone may be useful for distinguishing one individual plant from another.

This temporal data may be particularly useful when used by plant recognition engine 116 in combination with other plant attributes. As a non-limiting example, suppose a particular plant has a bounding shape of a particular width five weeks after being planted. Suppose the same plant is photographed two weeks later. A new bounding shape determined for the new digital image will likely be larger than the previous bounding shape, unless the plant is diseased or malnourished. An association between the time interval since the last photograph (two weeks) and an expected growth rate of the plant (individual or as part of a population) may have been effectively baked into the machine learning model during training. Consequently, the larger bounding shape, and in some implementations, a delta between the smaller and larger bounding shapes, may be used in conjunction with the new digital image to identify the plant in distinction from other plants.

Once plant recognition engine 116 has obtained the digital image and the additional data indicative of one or more attributes of the first plant, plant recognition engine 116 may process these data to recognize the first plant, e.g., in association with previous images of the first plant. In some implementations, plant recognition engine 116 may apply these data as input across a machine learning model to generate output. In some implementations, the output may include a latent space embedding. In some such implementations, the embedding may be close to, and therefore similar to, other embeddings in the latent space that were generated from other digital images of the same plant. Additionally or alternatively, in some implementations, the output may take the form of a unique identifier that is also associated with previously captured images of the plant.

Various types of machine learning models may be employed by plant recognition engine 116 to recognize individual plants. These may include, for instance, CNNs, other types of neural networks, sequence-to-sequence networks such as encoder-decoder networks, etc. In some implementations, a database 118 may be provided to store a plurality of machine learning models that may be applied by plant recognition engine 116 under different circumstances. In some implementations, a different machine learning model may be trained for each genus and/or species of plant. For example, one CNN may be trained to distinguish between individual strawberry plants, another may be trained to distinguish between individual tomato plants, another may be trained to distinguish between individual soy plants, etc. In other implementations, a single machine learning model may be trained to distinguish between individual plants across multiple species or genera.

Based on the output generated using the machine learning model, plant recognition engine 116 may store in database 114, or may cause digital image engine 112 to store in database 114, an association between the digital image that captures the first plant and one or more previously-captured digital images of the first plant. In some implementations, the first plant may have been previously assigned a unique identifier, such as a string of numbers, characters, symbols, or any combination thereof. The latest digital image capturing the first plant may then be assigned to or otherwise associated with this unique identifier, e.g., in database 114.

In other implementations, the latest digital image and the previous digital image(s) of the same plant may be associated with each other in other ways, such as using hash functions, links, pointers, etc.

In this specification, the term "database" and "index" will be used broadly to refer to any collection of data. The data of the database and/or the index does not need to be structured in any particular way and it can be stored on storage devices in one or more geographic locations. Thus, for example, the databases 114 and 118 may include multiple collections of data, each of which may be organized and accessed differently.

Once multiple digital images are associated in database 114 with a particular plant, user interface engine 120 may be interacted with by one or more client devices 106 to perform a variety of different agricultural applications. As one example, a client device 106 may provide a graphical user interface ("GUI") that is operable by a user to select individual plants, or groups of plants (e.g., a row of plants in a field, a section of plants, etc.). Once plant(s) are selected, the GUI may provide the user with various tools to learn more about the selected plant(s), such as their growth histories, disease statuses, pest infestation statuses, projected yield, experienced weather patterns, and so forth. Some tools may allow for the extraction of phenotype and/or genotype information of plant(s) from images of the plant(s). These phenotypes and/or genotypes may indicate, for instance, whether the plant is growing well (compared to other similar plants), is diseased or is susceptible to disease or is pest resistant, etc.

Figure 2:
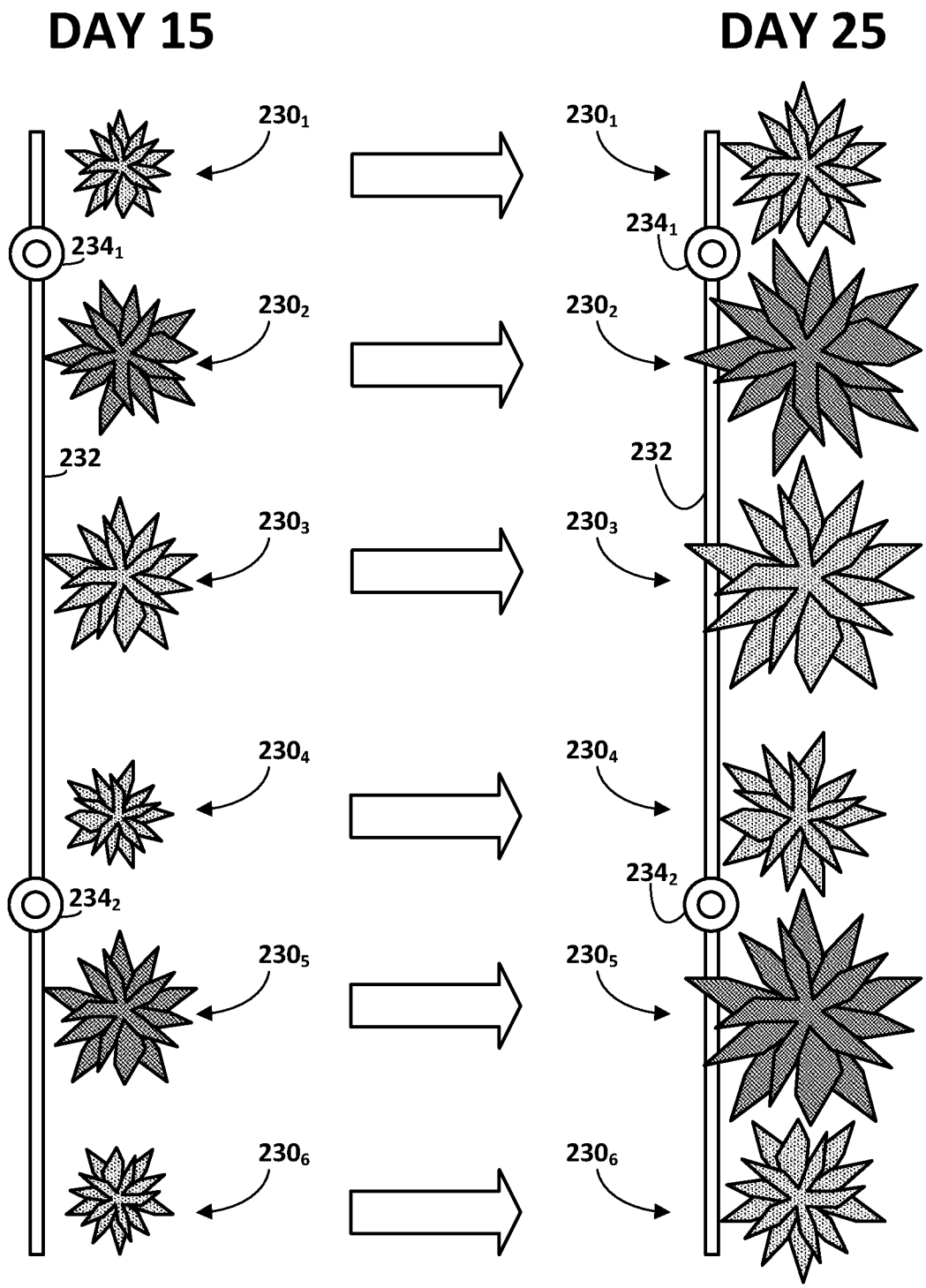
FIG. 2 depicts an example of how a row of plants may change over a time interval.

FIG. 2 depicts a row of six plants $230_{1-6}$ at fifteen days after planting on the left and twenty-five days after planting on the right. It can be seen that each plant 230 grew by some amount during this ten-day time interval, with the amount of growth varying based on the initial size of the plant 230. Also visible in FIG. 2 is irrigation equipment in the form of a pipe 232 that includes two sprinkler heads, $234_1$ and $234_2$, that are positioned, respectively, in between first and second plants $230_1$ and $230_2$ and in between fourth and fifth plants $230_4$ and $230_5$.

In various implementations, a vision sensor such as a 2D camera may be traversed along and/or above the row of plants $230_{1-6}$, e.g., by a robot 108 (not depicted in FIG. 2) so that digital images can be captured of the individual plants 230. In some cases the robot 108 may have wheels that touch the ground on one or both sides of plants $230_{1-6}$, such that the wheels flank the row of plants $230_{1-6}$. In other examples, the robot 108 may be an aerial drone that flies over plants $230_{1-6}$. Whichever type of robot is used to capture the digital images, the distances between individual plants in FIG. 2 is likely less than the amount of inherent error of a position coordinate sensor of the robot 108. Consequently, and as mentioned previously, the position coordinate associated with a digital image (e.g., added to the image's metadata based on the robot's position) may not be sufficiently accurate to conclusively recognize an individual plant 230 in distinction from other individual plants.

Accordingly, in various implementations, the content of the digital images themselves, which capture numerous features of individual plants, may be used, e.g., in combination with one or more of the previously-described plant attributes, to recognize individual plants 230. Although individual plants 230 likely would appear similar to a human, subtle visual features of those individual plants that are captured in the digital images may be used by computers to effectively establish a "fingerprint" for each plant 230. Based on this fingerprint, which may be associated with a unique identifier for the plant 230, it is possible to recognize individual plants 230 across time in distinction from other individual plants 230.

For example, the particular configuration of leaves of first plant $230_1$, including their size, orientation, number, color, leaf texture, angle, arrangement relative to each other, etc., may not appear substantially different to a person from configurations of leaves of other plants $230_{2-6}$. However, using techniques described herein, a machine learning model may be trained to distinguish between individual plants depicted in images based on these subtle differences that are not readily noticeable to a human. And in some implementations, other attributes of the plant 230 aside from its digital image may be used to distinguish it from other plants.

Figure 3:
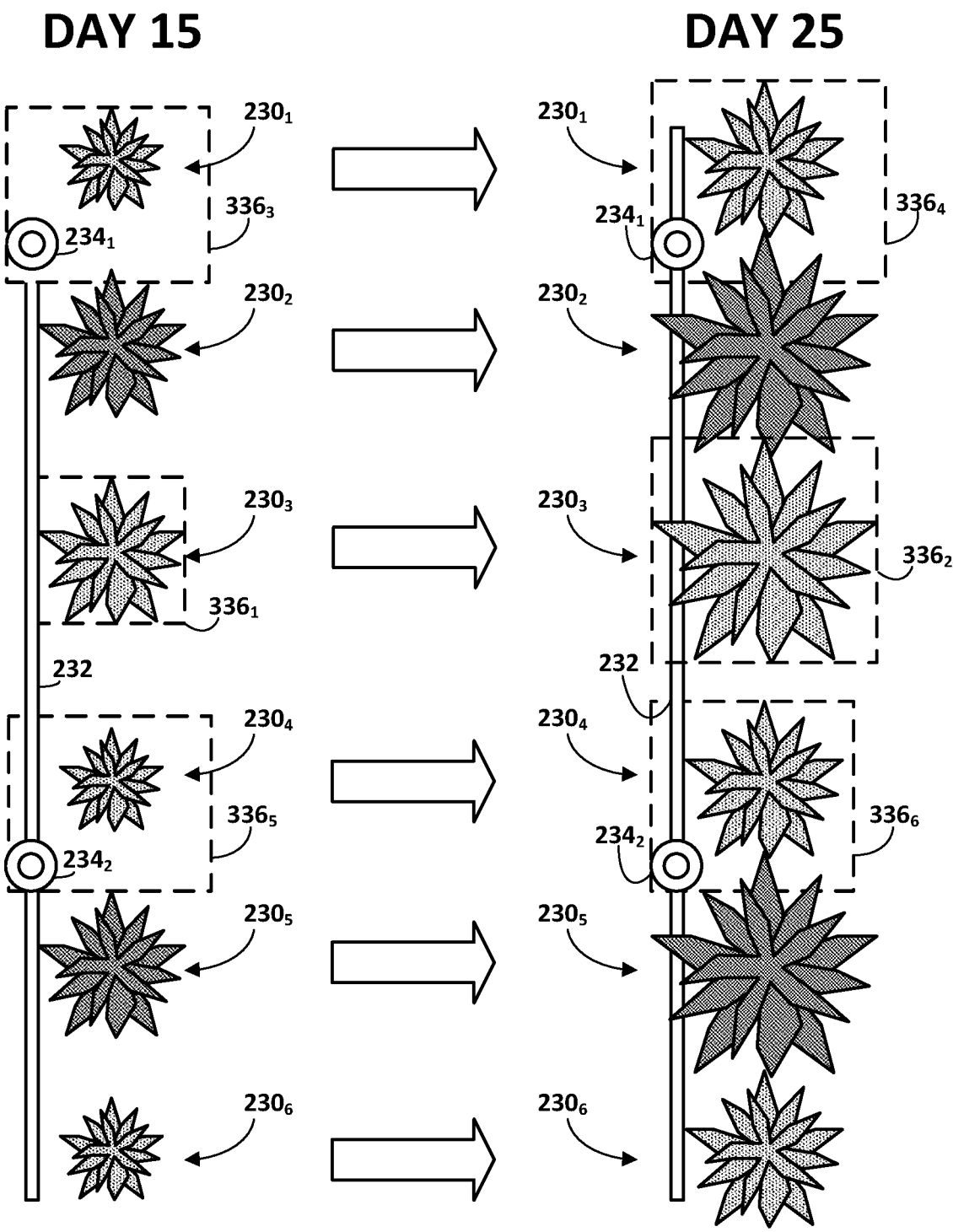
FIG. 3 illustrates examples of how techniques described herein may be applied to the plants of FIG. 2.

FIG. 3 depicts the same row of plants $230_{1-6}$ as FIG. 2 at the same times, namely, fifteen and twenty-five days. However, various annotations are added to various individual plants 230 of FIG. 3 in order to demonstrate how additional plant attributes, beyond digital images of the plants, may be used to aid in recognizing individual plants in distinction from other individual plants.

For example, in FIG. 3, a first bounding shape $336_1$ is detected around third plant $230_3$ at fifteen days. While bounding shape $336_1$ and other bounding shapes depicted in FIG. 3 are rectangular, this is not meant to be limiting. Other bounding shapes are contemplated herein, such as various polygons, triangles, circles, ovals, etc. In some implementations, the particular bounding shape used may be determined based on the type of plant. For example, some plants may be readily captured within a hexagon shape because that shape most closely tracks their outer contours. Other plants may be better captured using a pentagon, a circle, an elongate rectangle, etc.

First bounding shape $336_1$ is a minimum bounding shape that encloses an entirety of third plant $230_3$—that is, first bounding shape $336_1$ has the smallest size possible that captures the outer extremities of third plant $230_3$. In other implementations, a bounding shape may be detected that captures, for instance, some predetermined percentage of the plant, or a portion of the plant that is identified with at least a threshold amount of confidence. For example, the tips of leaves of a first plant may overlap with a neighboring plant. Accordingly, those overlapping portions of the first plant may not be identified as being part of the first plant with as much confidence as the middle of the first plant, and therefore may not necessarily be captured by a bounding shape. Similar to first bounding shape $336_1$, a second bounding shape $336_2$ is detected around third plant $230_3$ at twenty-five days. As is depicted in FIG. 3, second bounding shape $336_2$ is larger than first bounding shape $336_1$. This is unsurprising given that third plant $230_3$ grew during this time interval.

In various implementations, various aspects of bounding shapes $336_{1-2}$ may be used as additional plant attributes to recognize third plant $230_3$ as distinct from other plants $230_{1-2}$ and $230_{4-5}$. For example, a width and/or height of bounding shapes $336_{1-2}$ may be used as proxies for dimensions of third plant $230_3$. These additional attributes may be applied, e.g., by plant recognition engine 116, as additional inputs to a machine learning model, along with the digital images in which the bounding shapes $336_{1-2}$ were detected. The output of the machine learning model may distinguish the plant from other plants based at least in part on these additional attributes.

For example, a particular type of plant may be expected, absent extenuating circumstances and under conditions that are well-understood, to grow by a particular amount or percentage in a particular time interval. Accordingly, when matching later digital images of those plants to earlier digital images of those plants, this expected amount of growth may be detected in the dimensions of the later-detected bounding shape relative to the dimensions of bounding shapes of the earlier images of the plants.

In some implementations, this growth over a particular time period may be captured in the machine learning model during training. For example, for a training example, two images of the same plant may be captured at two points in time separated by a predetermined time interval, such as ten days, two weeks, etc. The training example may signal (e.g., be labeled with data) that the two images depict the same plant. In some such implementations, aspects of bounding shapes around the plants in the two digital images may be determined and applied as additional inputs to the machine learning model. To the extent the machine learning model fails to identify the plants in the two training images as the same plant, the machine learning model may be trained, e.g., using techniques such as gradient descent and/or back propagation, to more accurately classify the images as being of the same plant in the future. With enough similar training examples, the machine learning model may be trained to accurately match two temporally-distinct digital images of the same plant to each other, especially when bounding shape dimensions are also used as inputs.

Referring back to FIG. 3, as another example, a third bounding shape $336_3$ is depicted surrounding first plant $230_1$ at fifteen days. Unlike bounding shapes $336_{1-2}$, bounding shape $336_3$ does not tightly fit around first plant $230_1$. Rather, bounding shape $336_3$ captures at least some area around first plant $230_1$, e.g., to obtain an environmental context of first plant $230_1$. This is especially useful for first plant $230_1$ because first plant $230_1$ is adjacent first sprinkler head $234_1$. Consequently, the environmental context captured by bounding shape $336_3$ is relatively rich with information beyond first plant $230_1$ itself. Ten days later, a similar, if larger, bounding shape $336_4$ is detected around first plant $230_1$. Similar to bounding shape $336_3$, bounding shape $336_4$ captures, in addition to the various subtle visual features of first plant $230_1$ itself, the rich environmental context of first plant $230_1$, including first sprinkler head $234_1$.

Another bounding shape $336_5$ is detected around fourth plant $230_4$. Similar to first plant $230_1$, fourth plant $230_4$ is also near a sprinkler head, in this case second sprinkler head $234_2$. Consequently, bounding shape $336_5$ around fourth plant $230_4$ captures a similar environmental context as bounding shapes $336_{3-4}$ around first plant $230_1$. Likewise, another bounding shape $336_6$ is detected around fourth plant $230_4$ at day twenty five, and also captures second sprinkler head $234_2$. However, even though the environmental contexts of first plant $230_1$ and fourth plant $230_4$ are similar, these plants can still be distinguished from each other (and recognized individually) using other attributes of those plants, such as the unique visual fingerprint of each plant. And, first plant $230_1$ and fourth plant $230_4$ are relatively spaced from each other, likely more than the error of a robot's position coordinate sensor. Consequently, it is likely that position coordinates associated with images of these plants, when used as additional inputs for the machine learning model, will be very influential in distinguishing these plants from each other.

Figure 4:
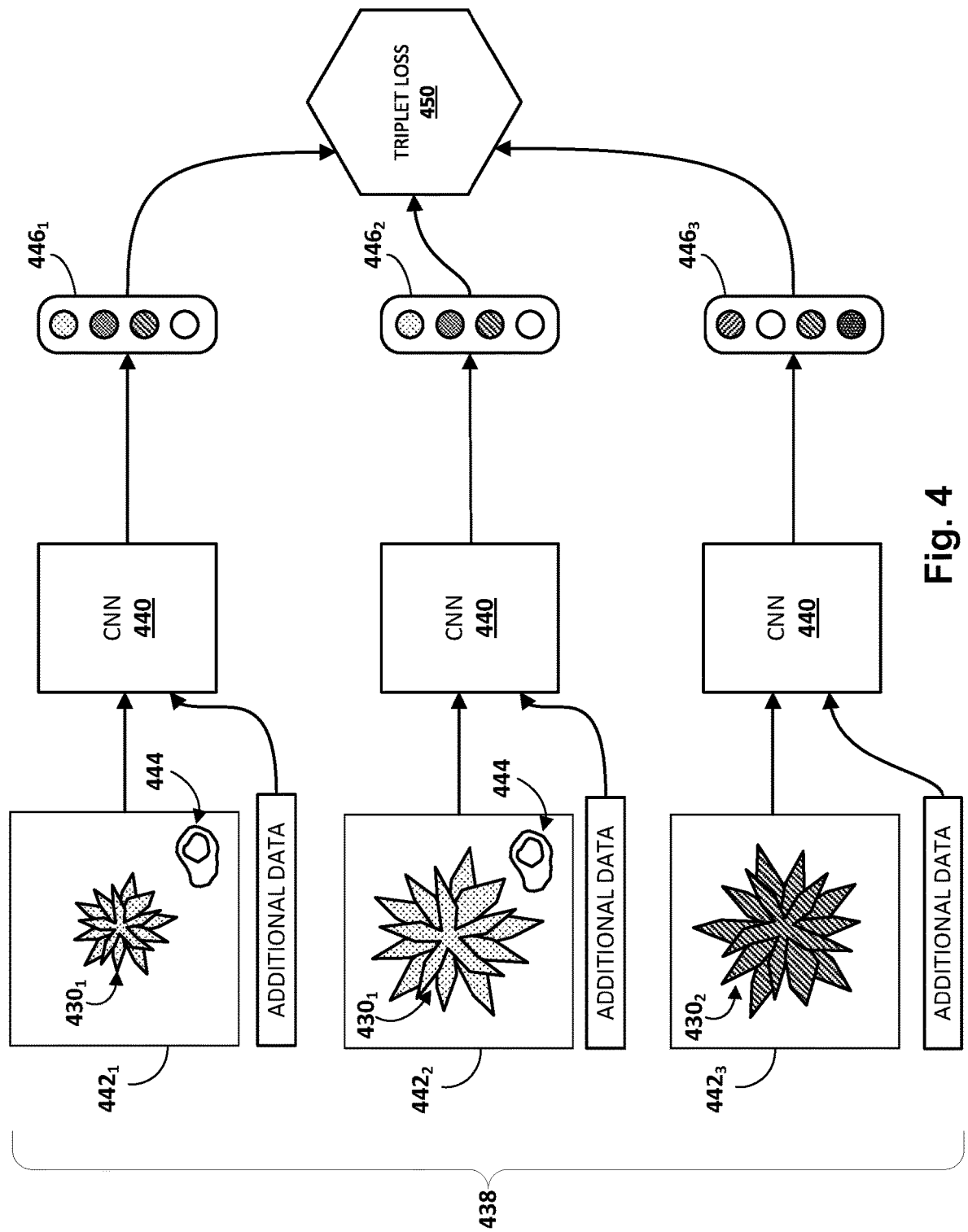
FIG. 4 schematically demonstrates one example of how a machine learning model may be trained.

FIG. 4 schematically depicts an example of how a machine learning model such as a convolutional neural network ("CNN") 440 can be trained to recognize individual plants in distinction from each other. In the example of FIG. 4, a loss function used to train CNN 440 is triplet loss. Each training instance 438 takes the form a triplet or 3-tuple that includes (i) an anchor image $442_1$ of a plant $430_1$ under consideration, (ii) a positive image $442_2$ that also captures plant $430_1$ under consideration (e.g., at a different time and/or from a different angle), and (iii) a negative image $442_3$ that depicts a different plant $430_2$. In some implementations, CNN 440 generates a latent space embedding based on input that includes one of the three digital images $442_{1-3}$ and data indicative of additional attribute(s) of the plant depicted in the one of the three digital images $442_{1-3}$.

To train CNN 440, in some implementations, the three images $442_{1-3}$ of training triplet 438 are applied as input across CNN 440 to generate three respective latent space embeddings $446_{1-3}$. As depicted in FIG. 3, the latent space embeddings $446_{1-2}$ generated from the anchor image $442_1$ and positive image $442_2$—both depicting the same plant $430_1$—are fairly similar, and therefore should be close together in latent space. By contrast, the latent space embedding $446_3$ generated from the negative image $442_3$, which depicts a different plant $430_2$, is different from the other two embeddings $446_{1-2}$, and therefore should be distanced from them in latent space. Accordingly, CNN 440 may be trained by minimizing a distance in the latent space between embedding $446_1$ generated from anchor image $442_1$ and embedding $446_2$ generated from positive image $442_2$. Meanwhile, a distance between embedding $446_1$ generated from anchor image $442_1$ and embedding $446_3$ generated from negative image $442_3$ may be maximized. In other implementations, the machine learning model may be trained using other techniques, such as using surrogate losses followed by separate metric learning steps.

FIG. 5 depicts an example GUI 550 that may be provided by user interface engine 120 to a client device 106. In some instances, GUI 550 may be provided as a website that is accessible via a web browser of a client device 106. In other instances, GUI 550 may be provided as part of a mobile app that operates on a mobile client device 106 (e.g., smart phone, tablet, etc.) using data received/obtained from agriculture knowledge system 102. In yet other instances where client device 106 is an HMD $106_N$, HMD $106_N$ may operate a VR or AR application that receives/obtains data from agriculture knowledge system 102 and provides a user with an immersive experience.

GUI 550 may be operable by a user to conduct various types of analysis on individual plants that are recognized using techniques described herein. In some implementations, a portion 552 of GUI 550 may depict an overhead view of a plurality of plants, e.g., in a field, along with some farm equipment ("F.E.") such as rain collection barrels, silos, etc. This view may be a single digital image captured from a vantage point above all the plants, a stitched-together image (e.g., a mosaic) generated from a plurality of digital images that each captures an individual plant, or even a simulated image of the field generated from, for instance, 3D point cloud data captured of the plants. In some implementations, GUI 550 may first provide the user with an opportunity to select a region, field, etc., and this selection may cause portion 552 to present an overhead view of the plants.

In various implementations, a user may be able to operate an input device such as a mouse or touchscreen to, for example, select individual plants depicted in portion 552, select groups of plants, zoom in/out from one or more plants, etc. By selecting plant(s), the user may then be able to view various information about those plant(s). In FIG. 5, for instance, various statistics are presented about the selected plant(s). These statistics included a health status of the plant(s) (e.g., diseased, healthy, malnourished, etc.), an estimated fruit volume (assuming the depicted plants are of a type that produces fruit, such as strawberry plants, etc.), an average fruit volume, a projected yield in kilograms, an average leaf size, an average leaf orientation (e.g., relative to a plane defined by the ground), various genotypes about the fruit (e.g., pest resistant, color, shape, etc.), and a number of branches in the plant(s). If multiple plants are selected, many of these numbers may be averages among the multiple selected plants.

A user may be able to perform other actions with selected plants as well. For example, at bottom of GUI 550, a selectable element ("CLICK HERE") is provided that a user can select to view a time-lapsed sequence of images of the selected plant(s). As another example, where such data is available, a user can view 3D data generated for the plants, such as point clouds of the entire plants, or of selected portions of the plants (e.g., fruit, leaves, etc.).

As yet another example, in some implementations, a user may be able to select a particular plant and a particular time during the plant's crop cycle, e.g., two weeks ago, three weeks in, two months into a crop cycle, three weeks in the future, etc. Based on these selections, the user may be presented with predictions about estimated plant growth and/or evolution of the plant. In some such implementations, these predictions may be determined using a time-sequence of images of the same plant, which may be associated with each other (e.g., in database 114) and/or with a unique identifier of the plant using techniques described herein. In some such implementations, these predictions may be based on other signals as well, such as known plant attributes/ genotypes/phenotypes (e.g., pest resistance, drought resistance, etc.), and/or exogenous factors such as irrigation, precipitation, sunlight, temperature, available/applied nutrients, applied fertilizers/pesticides, etc.

The GUI 550 of FIG. 5, and more particularly, the ability of the user to select and view information about individual plants over time, is made possible from techniques described herein. Without being able to recognize individual plants over time, in distinction from other plants, it might not be possible without extraordinary effort to track individual plants' progress, disease states, growth trajectories in view of environmental conditions, applied pesticides/fertilizers, etc.

In some implementations, a user may be able to search for individual plants and/or images of individual plants based on their attributes. For example, a user could provide the search query "show me plants infested with mites" at a GUI similar to 550. The search query may be provided to agriculture knowledge system 102. In response, agriculture knowledge system 102 may search database for plants in a particular field known to be infested with mites. The results may include a list of individual plants that were observed, e.g., in their respective time-sequence of images, to be infested with mites. A user may select any one of these results to view statistics about the plant associated with the selected result, to view a time-sequence of digital images of the plant associated with the selected result, etc.

In some implementations, a user may operate GUI 550 to view genotype and/or phenotype information about a selected plant. For example, the user may select a particular plant that appears to be growing well. The user can then see what genotype attributes and/or phenotype attributes are present in the selected plant. These genotype/phenotype attributes may be determined, for instance, by performing image processing on the digital images of the plant, or from known attributes of those plants. Once the user knows which genotype/phenotype attributes are present, the user can, for instance, search on those attributes to identify other individual plant(s) having similar attributes, or find other individual plant(s) that lack those attributes. In the latter case, the user may decide to cull the plant(s) lacking those attributes, e.g., to make room for new plants and/or to conserve nutrients and/or other resources for those remaining plants having favorable genotype/phenotype attributes.

Figure 6:
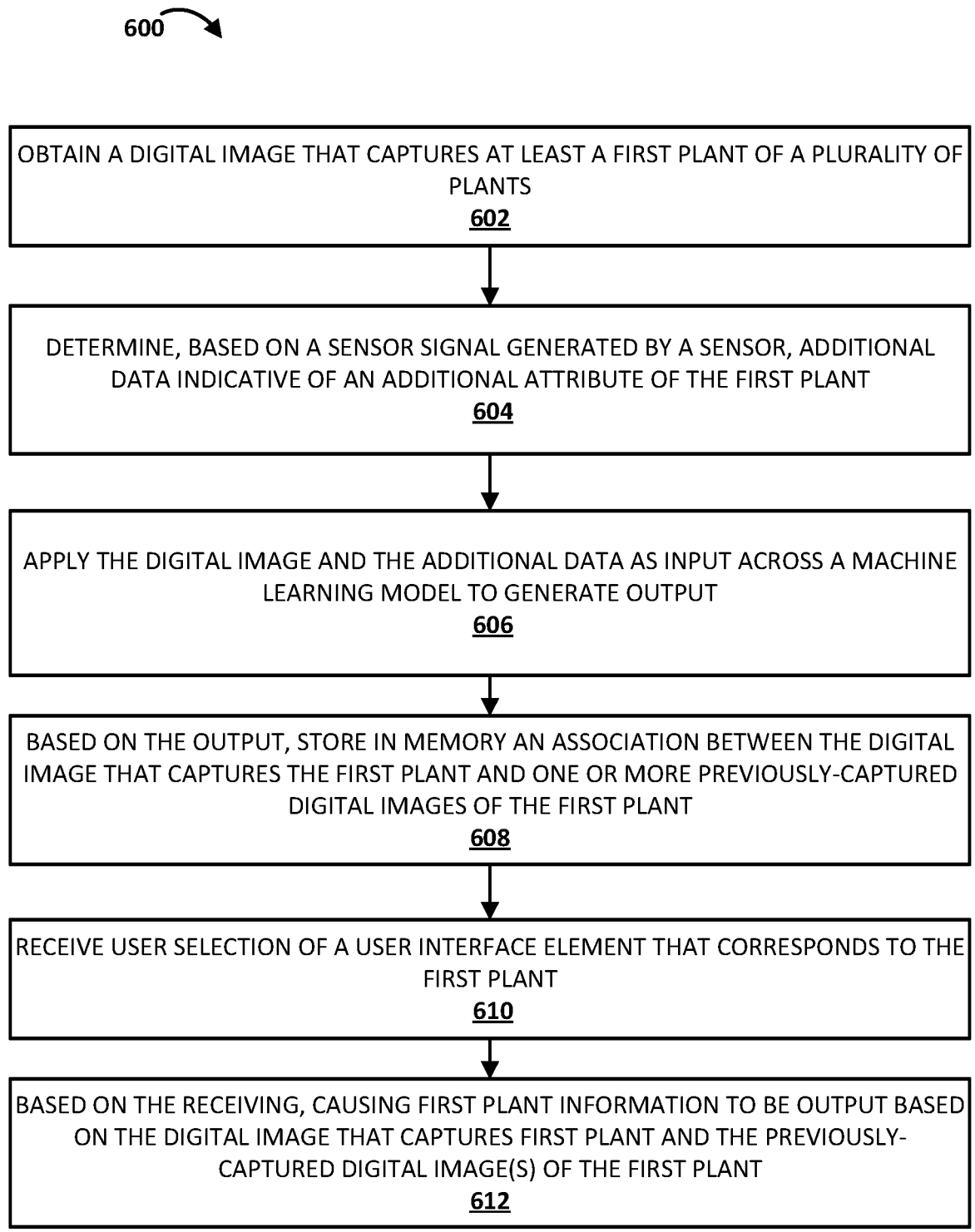
FIG. 6 depicts a flowchart illustrating an example method according to implementations disclosed herein.

FIG. 6 is a flowchart illustrating an example method 600 of performing selected aspects of the present disclosure, in accordance with implementations disclosed herein. For convenience, the operations of the flow chart are described with reference to a system that performs the operations. This system may include various components of various computer systems. Moreover, while operations of method 600 are shown in a particular order, this is not meant to be limiting. One or more operations may be reordered, omitted or added.

At block 602, the system may obtain a digital image that captures at least a first plant of a plurality of plants. As noted previously, this digital image may be obtained in real time, e.g., as it is captured by a robot 108, or it may be pulled by digital image engine 112 from database 114. At block 604, the system may determine, based on a sensor signal generated by a sensor that is relevant to the plant, additional data indicative of an additional attribute of the first plant. This sensor may be, for instance, the same vision sensor that captured the digital image (e.g., when the additional attribute is a bounding shape capturing, or an environmental context of, the plant), a tensiometer (to measure soil moisture), a position coordinate sensor of the robot 108 that took the picture, a thermometer, light sensor (e.g., to measure sunlight exposure), a clock, etc. The additional data indicative of the additional attribute of the plant may be, for instance, dimension(s) of a bounding shape, environmental context of the plant, a position coordinate associated with the digital image, a timestamp, a soil moisture measurement taken in closest temporal proximity to the digital image, a temperature reading, or a posteriori knowledge such as applied fertilizer/pesticides, genetic traits, etc.

At block 606, the system may apply the digital image and the additional data as input across a machine learning model to generate output. This output may be, for instance, a unique identifier associated with the plant, e.g., in database 114 or even 118, a latent space embedding that is clustered near other embeddings generated from other digital images of the same plant, etc. Based on the output generated at block 606, at block 608, the system may store, e.g., in database 114, an association between the digital image that captures the first plant and one or more previously-captured digital images of the first plant. For example, these images may be indexed in database 114 by a shared unique identifier.

Later, at block 610, the system may receive user selection, e.g., at a user interface such as GUI 550, a speech interface, etc., of a user interface element that corresponds to the first plant. For example, the user may select the first plant in portion 552 of GUI 550. Based on the user selection received at block 610, at block 612, the system may cause first plant information to be output. This first plant information may be determined based on, among other things, the digital that captures the first plant and the previously-captured digital image(s) of the first plant.

Figure 7:
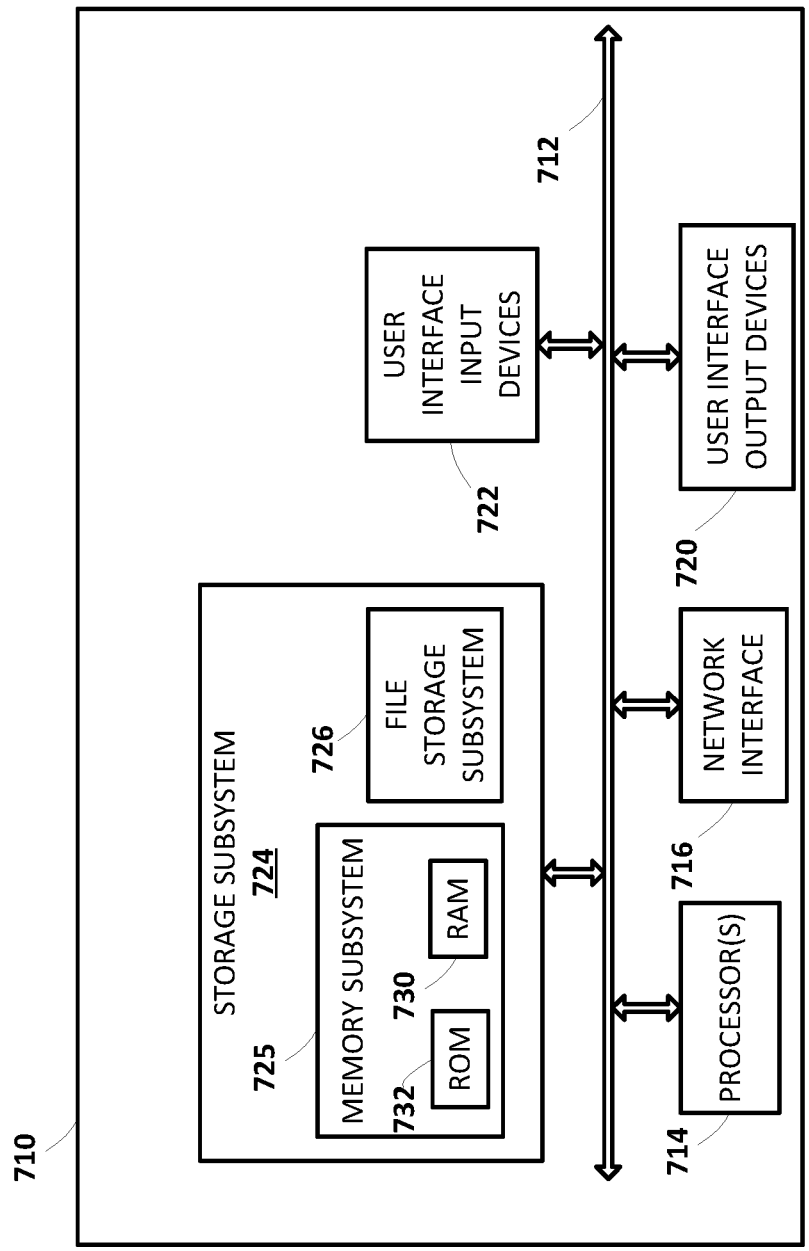
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a first digital image that captures a depiction of a first individual plant of a plurality of plants;
    determining, based on a sensor signal generated by a sensor, additional data indicative of an additional attribute of the first individual plant;
    applying both the first digital image and the additional data as inputs across a trained machine learning model to generate an embedding, wherein the machine learning model was previously trained using a plurality of training instances and triplet loss, and wherein each training instance includes one or more training digital images of a particular plant and additional data indicative of an additional attribute of the particular plant when the one or more training digital images were taken;
    determining distances in latent space between the embedding and a plurality of reference embeddings generated from a plurality of digital images captured previously to the first digital image;
    based on the distances, matching the depiction of the first individual plant captured in the first digital image to one or more depictions of the same first individual plant captured in a subset of one or more of the previously-acquired digital images; and
    based on the matching, storing in memory an association between the first digital image that captures the depiction of the first individual plant and the subset of one or more previously-acquired digital images that capture the one or more matching depictions of the same first individual plant during an earlier stage of growth.

2. The method of claim 1, wherein the obtaining includes:
    operating an autonomous or semiautonomous vehicle equipped with a vision sensor to traverse along a path that is proximate to at least a subset of the plurality of plants; and operating the vision sensor to acquire the digital image that captures the first individual plant.

3. The method of claim 1, wherein the machine learning model comprises a convolutional neural network.

4. The method of claim 1, wherein the sensor comprises a position coordinate sensor, and the additional attribute of the first individual plant comprises a position coordinate indicative of a location of the first individual plant.

5. The method of claim 1, wherein the sensor comprises a vision sensor.

6. The method of claim 5, wherein the additional attribute of the first individual plant that is applied as input across the machine learning model to generate the embedding comprises a spatial dimension of a bounding shape, determined from one or more digital images generated by the vision sensor, that encloses at least a portion of the first individual plant.

7. The method of claim 6, wherein the bounding shape comprises a minimum bounding shape that encloses an entirety of the first individual plant.

8. The method of claim 5, wherein the additional attribute of the first individual plant comprises an environmental context of the first individual plant captured in one or more digital images generated by the vision sensor.

9. The method of claim 5, wherein the additional attribute of the first individual plant comprises a time interval since a milestone in a life of the first individual plant.

10. The method of claim 1, further comprising:
receiving, from a graphical user interface rendered on a computing device, user selection of a user interface element that corresponds to the first individual plant; and
based on the receiving, causing the computing device to output first individual plant information based on the digital image that captures the depiction of the first individual plant and one or more of the previously-acquired digital images that capture the one or more matching depictions of the first individual plant.

11. The method of claim 10, wherein the first individual plant information includes a time-based sequence of digital images that includes the digital image that captures the depiction of the first individual plant and one or more of the previously-acquired digital images that capture the one or more matching depictions of the first individual plant.

12. The method of claim 10, wherein the first individual plant information includes first individual plant growth or health statistics generated based on the digital image that captures the depiction of the first individual plant and one or more of the previously-acquired digital images that capture the one or more matching depictions of the first individual plant.

13. The method of claim 1, further comprising:
analyzing the digital image that captures the depiction of the first individual plant and one or more of the previously-acquired digital images that capture the one or more matching depictions of the first individual plant; and
based on the analyzing, predicting a growth rate or yield of the first individual plant.

14. A system comprising one or more processors and memory storing instructions that, in response to execution of the instructions by the one or more processors, cause the one or more processors to:
obtain a first digital image that captures a depiction of a first individual plant of a plurality of plants;
determine, based on a sensor signal generated by a sensor, additional data indicative of an additional attribute of the first individual plant;
applying both the first digital image and the additional data as inputs across a trained machine learning model to generate an embedding, wherein the machine learning model was previously trained using a plurality of training instances and triplet loss, and wherein each training instance includes one or more training digital images of a particular plant and additional data indicative of an additional attribute of the particular plant when the one or more training digital images were taken;
determine distances in latent space between the embedding and a plurality of reference embeddings generated from a plurality of digital images captured previously to the first digital image;
based on the distances, match the depiction of the first individual plant captured in the first digital image to one or more matching depictions of the same first individual plant captured in a subset of one or more of the previously-acquired digital images; and
based on the match, store in memory an association between the first digital image that captures the depiction of the first individual plant and the subset of one or more previously-acquired digital images that capture the one or more matching depictions of the same first individual plant during an earlier stage of growth.

15. The system of claim 14, wherein the obtaining includes:
operating an autonomous or semiautonomous vehicle equipped with a vision sensor to traverse along a path that is proximate to at least a subset of the plurality of plants; and
operating the vision sensor to acquire the digital image that captures the depiction of the first individual plant.

16. The system of claim 14, wherein the machine learning model comprises a convolutional neural network.

17. The system of claim 14, wherein the sensor comprises a position coordinate sensor, and the additional attribute of the first individual plant comprises a position coordinate indicative of a location of the first individual plant.

18. At least one non-transitory computer-readable medium comprising instructions that, in response to execution of the instructions by one or more processors, cause the one or more processors to perform the following operations:
obtaining a first digital image that captures a depiction of a first individual plant of a plurality of plants;
determining, based on a sensor signal generated by a sensor, additional data indicative of an additional attribute of the first individual plant;
applying both the first digital image and the additional data as inputs across a trained machine learning model to generate an embedding, wherein the machine learning model was previously trained using a plurality of training instances and triplet loss, and wherein each training instance includes one or more training digital images of a particular plant and additional data indicative of an additional attribute of the particular plant when the one or more training digital images were taken;
determining distances in latent space between the embedding and a plurality of reference embeddings generated from a plurality of digital images captured previously to the first digital image;
based on the distances, matching the depiction of the first individual plant captured in the first digital image to one or more depictions of the same first individual plant captured in a subset of one or more of the previously-acquired digital images; and based on the matching, storing in memory an association between the first digital image that captures the depiction of the first individual plant and the subset of one or more previously-acquired digital images that capture the one or more matching depictions of the same first individual plant during an earlier stage of growth.

* * * * *